(No Model.) 2 Sheets—Sheet 1.
F. L. FULLER.
INDICATING OR LIKE MECHANISM FOR PRICE SCALES.
No. 603,505. Patented May 3, 1898.
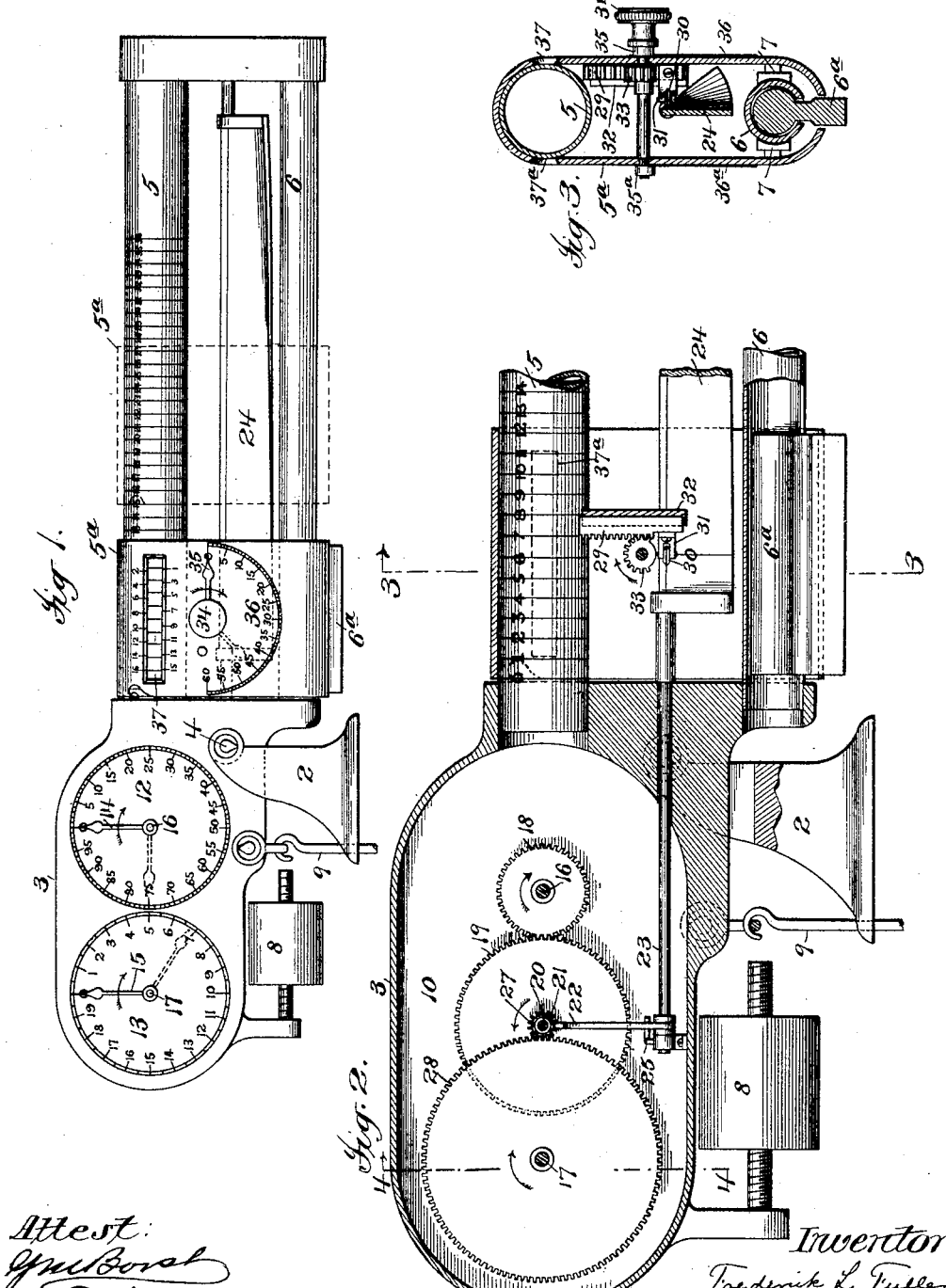
Attest:
Inventor:
Frederick L. Fuller
By Philipp Phelps Sanger
Attys.

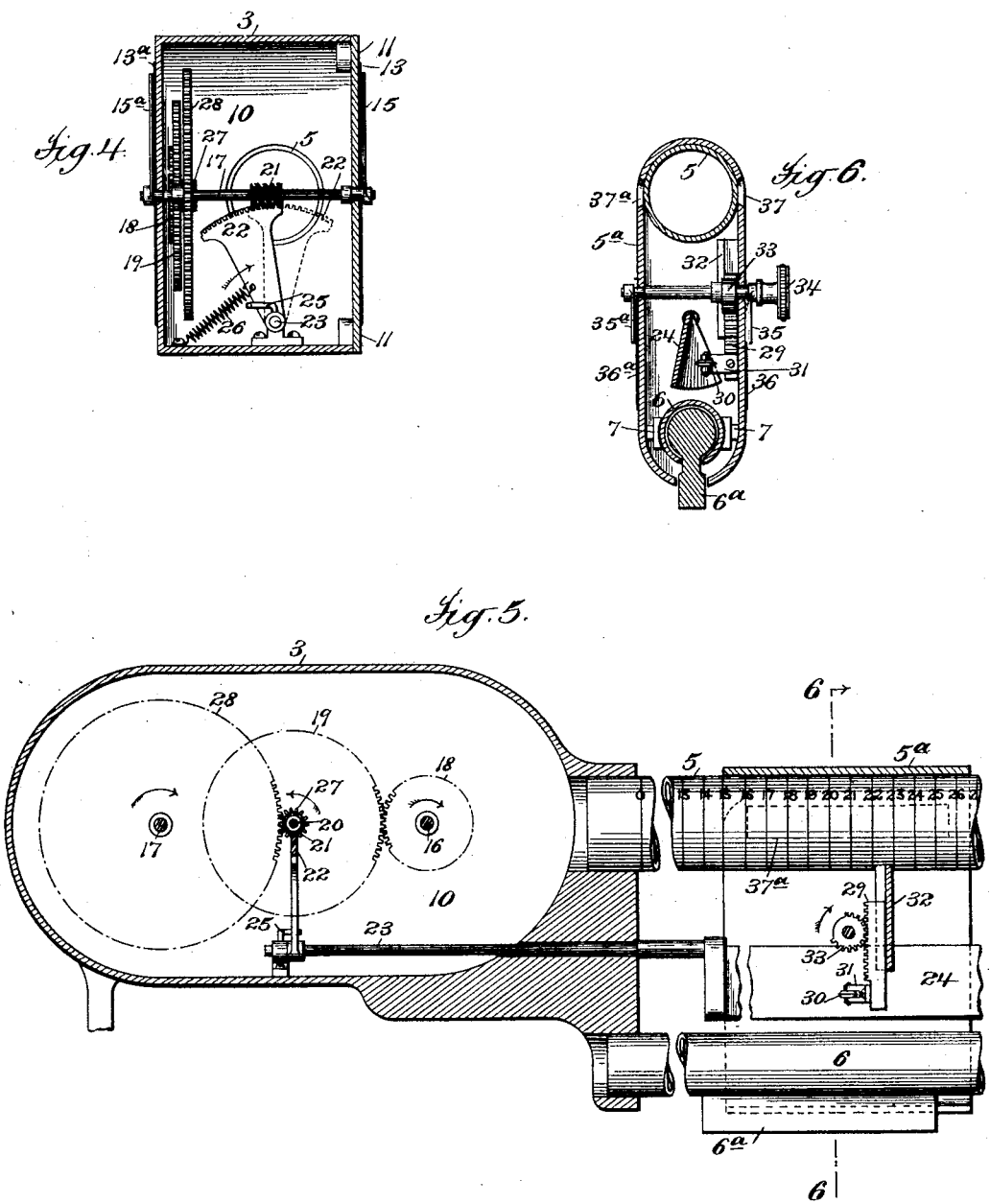

UNITED STATES PATENT OFFICE.

FREDERICK L. FULLER, OF TRENTON, NEW JERSEY.

INDICATING OR LIKE MECHANISM FOR PRICE-SCALES.

SPECIFICATION forming part of Letters Patent No. 603,505, dated May 3, 1898.

Application filed September 14, 1897. Serial No. 651,579. (No model.)

*To all whom it may concern:*

Be it known that I, FREDERICK L. FULLER, a citizen of the United States, residing at Trenton, county of Mercer, and State of New Jersey, have invented certain new and useful Improvements in Indicating or Like Mechanism for Price-Scales or other Machines, fully described and represented in the following specification and the accompanying drawings, forming a part of the same.

This invention relates to improvements in indicating mechanism designed particularly for application to weighing-scales for the purpose of indicating the price or total cost of articles weighed, it being the object of the present invention to provide mechanism of this character which shall be of simple and durable construction, having few parts, and which shall be reliable and accurate both in adjustment and in operation.

Broadly the invention consists in an indicating or like mechanism for application to price-scales and other machines comprising a rotary member consisting of a pivoted wing having an inclined face for controlling the extent of its operation and an actuator therefor, one of said members, preferably the actuator, being adjustable transversely to the other and the inclination of the rotary member or wing varying progressively in the direction of such adjustment to suit in the case of price-scales variations in the unit prices of the articles weighed, so as to secure actuation of the indicating mechanism in accordance with such unit price.

As the improvements constituting the present invention have been designed particularly for application to price-scales, in combination with which they have peculiar advantages and will be more generally used, they have for convenience been illustrated herein and will be hereinafter described in detail in such connection, although it is to be understood that they are of general application.

In the accompanying drawings, Figure 1 is a side elevation of a scale-beam equipped with the improvements of the present invention, a small portion of the scale-frame being shown. Fig. 2 is a sectional elevation, on an enlarged scale, of a portion of the same, illustrating particularly the price-indicating mechanism. Fig. 3 is a cross-section taken on the line 3 3 of Fig. 2. Fig. 4 is a cross-section of the same, taken on the line 4 4 of Fig. 2. Fig. 5 is a view similar to Fig. 2, illustrating parts of the price-indicating mechanism in the positions they occupy after the operation of the scale in weighing and indicating the price of an article; and Fig. 6 is a section on the line 6 6 of Fig. 5.

The particular class of scale in connection with which the invention is illustrated in the drawings is that known as a "beam-scale," such scale being selected because the invention in the form in which it is illustrated in the drawings, which is the preferred form, is particularly applicable to scales of this class.

Referring to said drawings, 2 represents a portion of the frame of a beam-scale, and 3 its beam, which is fulcrumed at 4 and has two rods 5 6, provided with poises $5^a$ $6^a$, respectively, (the latter being the tare-poise,) the graduations upon the upper or main rod 5 extending up to thirty-six pounds. The poise $5^a$ embraces the rod 5 and also projects below the rod 6, being provided with guards 7, which bear against the rod 6, so as to steady the poise $5^a$, while the tare-poise $6^a$ travels in a longitudinal slot in the under side of the rod 6. Upon the opposite side of the fulcrum 4 the scale-beam 3 is provided with the usual adjusting-poise 8 and platform or pan connecting rod 9. This end of the beam 3 also, as will be observed, is formed to provide a casing or housing 10, closed by a plate 11, for receiving and inclosing working parts of the indicating devices, as will presently appear. The side of the scale-beam 3 illustrated in Figs. 1, 2, and 5 is the attendant's side. This is the side which for convenience will be hereinafter particularly referred to; but, as will hereinafter appear, the indications made on this side of the scale, both as to weight, rate, and price or total cost, will be simultaneously made on the opposite or customer's side.

The indicating mechanism consists generally of indicating-dials 12 13 on the attendant's side, representing cents and dollars, respectively, with which coact pointers 14 15, respectively, the shafts 16 17 of which are journaled in the scale-beam 3. The shaft 16 of the pointer 14 is provided with a gear 18, which is engaged by a pinion 19 on a shaft 20, having a worm-wheel 21, engaged by a corresponding toothed segment 22, carried by a rock-shaft 23, journaled in the beam 3 within the housing 10, and which is secured to a wing 24, pivoted in the scale-beam, and which is adapted to be engaged and rocked rearwardly by an actuator carried by the poise $5^a$ as the latter is moved in weighing, as will hereinafter appear. As the segment is thus rocked it will, through the gear 18 and pinion 19, rotate the pointer 14 in the direction indicated by the arrow in Figs. 1, 2, and 5. The segment 22 normally rests against a stop 25, in which position it is retained by a spring 26, which also after each operation returns the segment and the wing 24 to normal position. The shaft 20 is also provided with a gear 27, which engages a pinion 28 on the shaft 17 of the pointer 15, so that as the pointer 14 is revolved over dial 12 the pointer 15 will also be revolved in a like direction over its dial 13, as indicated by the arrows in Figs. 1, 2, and 5.

The actuator carried by the poise $5^a$ for rocking the wing 24 consists of a vertically-adjustable rack-bar 29, bearing a roller 30, journaled in a bracket 31 in the lower end of said rack-bar. The rack-bar 29 is supported so as to slide vertically in a guide 32, secured to the poise, and is engaged by a pinion 33, journaled in the poise and provided with a thumb-piece or handle 34, projecting outside the poise into convenient position to be grasped by the hand of the attendant, so that the attendant may, by turning the thumb-piece 34, move the rack-bar 29 and its roller 30 vertically into any desired position with relation to the axis of the wing, the position to which the roller 30 is so adjusted representing the rate per pound of the article to weighed. The shaft of pinion 33 is provided with a pointer 35, coacting with a dial 36, formed on the side of the poise and graduated to represent in cents the rates of articles to be weighed, extending in amount from nothing to sixty cents.

The dials 12, 13, and 36, heretofore described, are, as before stated, located on the attendant's side of the scale. For convenience similar dials are also located upon the opposite or customer's side of the scale, two of which, the dollars-dial $13^a$ and rate-dial $36^a$, with their pointers $15^a$ and $35^a$, are illustrated in Figs. 3, 4, and 6, so that the purchaser can readily see the rate per pound and also the price of the article weighed. On the attendant's side of the scale, as illustrated in Fig. 1, dollars and cents are read, respectively, from left to right; but on the purchaser's side of the scale the arrangement is reversed, the reading being from right to left.

The face of the wing 24 is inclined from left to right lengthwise or in the direction of its axis, so that the rack-bar 29 and roller 30 may be adjusted downwardly from the position in which they are shown in Fig. 2. As the poise $5^a$ is then moved from "0" position, as in weighing, the roller 30, engaging the inclined portion of the wing 24, will rock said wing, and through it the segment 22, a distance proportionate to the extent of movement of the poise along the rod 5, which movement of the poise depends of course upon the weight of the article weighed. The wing 24, inclined, as before stated, in the direction of its axis, is also inclined radially thereof, or, in other words, in the direction in which the roller 30 is adjustable, to suit variations in the unit prices of the articles weighed. As the roller 30 is adjusted downwardly from the position in which it is shown in Fig. 2—that is, away from the axis of the wing—the extent of movement of the wing 24 and segment 22 for a given number of pounds is increased, while when it is adjusted in the opposite direction it is decreased, the wing having its greatest inclination at its outer edge. The face of the wing 24 is not entirely inclined, its inner portion, against which the roller 30 rests in "0" position, being plain. The inclination of the wing 24 in both directions is sufficient in extent for the capacity (thirty-six pounds) of the scale and for rates per pound extending up to sixty cents. For scales of larger weighing capacity and higher rates corresponding changes will of course be made in the inclination of the wing 24 in both directions.

Normally the several parts occupy the positions in which they are shown in Figs. 1 to 4—that is, with the roller 30 in line with the axis of the wing 24. With the parts in this position the scale may, if desired, be used simply for the purpose of weighing, the movement of the poise $5^a$ and roller 30 along the rod 5 and wing 24, respectively, producing no movement of the wing 24, because the roller 30 is in line with the axis or the uninclined portion of the wing. If, however, it be desired to indicate the cost of the article in addition to its weight, all that need be done is to rotate the pointer 35 in the direction indicated by the arrow, Figs. 1, 2, and 5, to the graduation on dial 36, representing the rate per pound, and bring it to rest at that point. As the pointer 35 is thus rotated the pinion 33 will lower the rack-bar 29 from the position shown in Fig. 2, and with it the roller 30, the latter being thus moved away from the plain portion of the wing 24 into position in line with the inclined portion thereof corresponding to the rate. As the poise $5^a$ is then moved to weigh the roller 30 engaging the wing 24 will rock the latter rearwardly a distance corresponding to the extent of movement of the poise $5^a$ multiplied by the degree of inclination of that portion of the wing 24 which is engaged by the roller 30—in other words, the weight multiplied by the rate per pound or other unit. The result or total cost of the article will be indicated on the dials 12 13 on the attendant's side and simultaneously by the corresponding dials on the opposite or customer's side of the scale. Let us assume that the unit price or rate per pound be forty-five cents. The pointer 35 will be brought to rest opposite the graduation "45" on dial 36. As the pointer 35 is moved to this position the roller 30, through the connections described, will be adjusted to about the position shown in Figs. 5 and 6. If the weight be fifteen pounds, the poise $5^a$ will be moved to the position shown by dotted lines in Fig. 1. The wing 24 will in such case be swung rearwardly to about the position shown in Fig. 6 and the segment 22 to about the position shown by dotted lines, Fig. 4, and the pointers 14 15 moved to the positions in which they are shown by dotted lines, Fig. 1, indicating "$7.50" as the total cost. If the unit price of the next sale be less than forty-five cents, the roller 30 will be adjusted from its forty-five-cent position inwardly toward the axis of the wing 24.

In order to obtain a large capacity in pounds on the scale-beam, I preferably omit from the rod 5 ounce graduations and employ a vernier for indicating ounces. For this purpose I provide the poise $5^a$ upon each side of the scale-beam with an opening 37 $37^a$, through which may be seen the graduations upon the rod 5. At this opening I provide graduations, sixteen in number, which by movement of the poise may be made to coincide with the graduations upon the rod 5. These graduations I arrange in two rows, the lower row including the odd numbers, while the upper row includes the even numbers. The graduations on the lower row are distanced apart a space equal to one and two-sixteenths the distance between two graduations upon the rod 5, while those upon the upper row are similarly separated from each other, but lie behind those of the lower row a distance equal to one-sixteenth of a pound graduation on the rod 5. The two rows are thus staggered, or the graduations of the two rows alternate— that is, when graduation "1" is one-sixteenth behind a pound graduation on rod 5 the graduation "2" will be two-sixteenths behind the same pound graduation and graduation "3" will be three-sixteenths behind the next pound graduation, and so on. All that is necessary to do, therefore, in order to ascertain the number of ounces weighed is to inspect the two rows of graduations and ascertain which one of them coincides or registers with a pound graduation upon the rod 5. In the position in which the parts are shown in Figs. 1 and 2 the poise is at "0," the vernier graduation "16" coinciding with a pound graduation on the rod 5. If the weight of the article weighed be one ounce, the vernier graduation "1" will be found to coincide with the pound graduation nearest to it, or if the weight be six ounces the vernier graduation "6," which at "0" is six-sixteenths behind the nearest pound graduation, will coincide with some graduation on the scale-beam.

As before stated, the rate and cost indications on the attendant's side of the beam are repeated on the customer's side. It is also desirable in order to complete the indications at the latter side that the weight indications should also be repeated there. For this purpose the pound graduations on the rod 5 run around the rod 5, the ounce graduations being read through the opening $37^a$ by means of the vernier on the customer's side of the beam.

I prefer to construct the scale-beam and poise as shown in the drawings—that is, by forming the main rod 5 of tubing and correspondingly shaping the poise $5^a$, as by so constructing them a wide and smooth bearing and at the same time a close relation of poise and beam are secured, which while permitting ready movement of the poise manually holds the poise steadily in position. The tare-beam 6 is also formed of tubing, which is provided with a slot on its under side in which the poise $6^a$ moves.

As before stated, the construction illustrated in the drawings embodies the invention in what is considered its preferred form. Modifications and changes may be made therein without departing from the invention.

What is claimed is—

1. An indicating or like mechanism comprising an inclined member, and an actuator therefor, said members being adjustable one relatively to the other transversely to the incline and said incline varying progressively in the direction of adjustment, substantially as described.

2. An indicating or like mechanism comprising a pivoted inclined member, and an actuator therefor, said members being adjustable one relatively to the other transversely to the incline and said incline varying progressively in the direction of adjustment, substantially as described.

3. An indicating or like mechanism comprising a pivoted wing inclined in the direction of its axis, and an actuator therefor, said members being adjustable one relatively to the other transversely to the incline and said incline varying progressively in the direction of adjustment, substantially as described.

4. An indicating or like mechanism comprising an inclined member, and an actuator therefor adjustable transversely to the incline, said incline varying progressively in the direction of adjustment, substantially as described.

5. An indicating or like mechanism comprising a pivoted inclined member, and an actuator therefor adjustable transversely to the incline, said incline varying progressively in the direction of adjustment, substantially as described.

6. An indicating or like mechanism comprising a pivoted wing inclined in the direction of its axis, and an actuator therefor adjustable transversely to the incline, said incline varying progressively in the direction of adjustment, substantially as described.

7. The combination with weighing mechanism, of price-computing mechanism comprising an inclined member and an actuator therefor, said members being adjustable one relatively to the other transversely to the incline and said incline varying progressively in the direction of adjustment, one of said members being movable past the other to actuate the computing mechanism in accordance with the weight of the article, substantially as described.

8. The combination with weighing mechanism, of price-computing mechanism comprising a pivoted inclined member and an actuator therefor, said members being adjustable one relatively to the other transversely to the incline and said incline varying progressively in the direction of adjustment one of said members being movable past the other to actuate the computing mechanism in accordance with the weight of the article, substantially as described.

9. The combination with weighing mechanism, of price-computing mechanism comprising an inclined member, and an actuator therefor adjustable transversely to the incline, said incline varying progressively in the direction of adjustment, said actuator being movable past the inclined member to actuate the latter, substantially as described.

10. The combination with weighing mechanism, of price-computing mechanism comprising a pivoted inclined member, and an actuator therefor adjustable transversely to the incline, said incline varying progressively in the direction of adjustment, said actuator being movable past the inclined member to actuate the latter, substantially as described.

11. The combination with weighing mechanism, of price-computing mechanism comprising a pivoted wing inclined in the direction of its axis, and an actuator therefor adjustable transversely to the incline, said incline varying progressively in the direction of adjustment, said actuator being movable past the inclined member to actuate the latter, substantially as described.

12. The combination with a scale-beam, of price-computing mechanism comprising an inclined member, and an actuator therefor, said members being adjustable one relatively to the other transversely to the incline, and said incline varying progressively in the direction of adjustment, one of said members being movable along the beam past the other to actuate the inclined member, substantially as described.

13. The combination with a scale-beam, of price-computing mechanism comprising a pivoted inclined member and an actuator therefor, said members being adjustable one relatively to the other transversely to the incline, and said incline varying progressively in the direction of adjustment, one of said members being movable along the beam past the other to actuate the inclined member, substantially as described.

14. The combination with a scale-beam, of price-computing mechanism comprising an inclined member, and an actuator therefor movable along the beam, said members being adjustable one relatively to the other transversely to the incline and said incline varying progressively in the direction of adjustment, substantially as described.

15. The combination with a scale-beam, of price-computing mechanism comprising a pivoted member and an actuator therefor movable along the beam, said members being adjustable one relatively to the other transversely to the incline and said incline varying progressively in the direction of adjustment, substantially as described.

16. The combination with a scale-beam, of price-computing mechanism comprising a pivoted wing inclined in the direction of its axis, and an actuator therefor movable along the beam, said members being adjustable one relatively to the other transversely to the incline and said incline varying progressively in the direction of adjustment, substantially as described.

17. The combination with a scale-beam and its poise, of price-computing mechanism comprising an inclined member, and an actuator therefor movable by the poise along the beam to actuate the inclined member and adjustable transversely to the incline, said incline varying progressively in the direction of adjustment, substantially as described.

18. The combination with a scale-beam and its poise, of price-computing mechanism comprising a pivoted inclined member, and an actuator therefor movable by the poise along the beam to actuate the inclined member and adjustable transversely to the incline, said incline varying progressively in the direction of adjustment, substantially as described.

19. The combination with a scale-beam and its poise, of price-computing mechanism comprising a pivoted wing inclined in the direction of its axis, and an actuator therefor movable by the poise along the beam and adjustable transversely to the incline, said incline varying progressively in the direction of adjustment, substantially as described.

20. The combination with a scale-beam, of price-computing mechanism comprising an inclined member and a member coacting therewith, said members being adjustable one relatively to the other transversely to the incline, and said incline varying progressively in the direction of adjustment, one of said members being movable along the beam past the other to actuate the computing mechanism, substantially as described.

21. The combination with a scale-beam, of price-computing mechanism comprising a rotary inclined member and an actuator therefor movable along the beam, said members being adjustable one relatively to the other transversely to the incline, and said incline varying progressively in the direction of adjustment, indicating devices, and worm-gearing connecting said inclined member and indicating devices, substantially as described.

22. The combination with a scale-beam, of price-computing mechanism comprising a pivoted wing inclined in the direction of its axis, and an actuator therefor movable along the beam, said members being adjustable one relatively to the other transversely to the incline and said incline varying progressively in the direction of adjustment, indicating devices, and worm-gearing connecting said wing and indicating devices, substantially as described.

23. The combination with a scale-beam and its poise, of price-computing mechanism comprising a rotary inclined member and an actuator therefor movable by the poise along the beam to actuate the inclined member and adjustable transversely to the incline, said incline varying progressively in the direction of adjustment, indicating devices, and worm-gearing connecting said inclined member and indicating devices, substantially as described.

24. The combination with a scale-beam and its poise, of price-computing mechanism comprising a pivoted wing inclined in the direction of its axis, and an actuator therefor movable by the poise along the beam and adjustable transversely to the incline, said incline varying progressively in the direction of adjustment, indicating devices and worm-gearing connecting said wing and indicating devices, substantially as described.

25. The combination with weighing mechanism, of price-computing mechanism comprising an inclined member and a member coacting therewith, said members being adjustable one relatively to the other, indicating devices and worm-gearing connecting the actuated member with said indicating devices, substantially as described.

26. The combination with weighing mechanism of price-computing mechanism comprising an inclined member and a member coacting therewith, said members being adjustable one relatively to the other transversely to the incline, and said incline varying progressively in the direction of adjustment, indicating devices, and worm-gearing connecting the actuated member with said indicating devices, substantially as described.

27. The combination with the scale-beam and its poise, of the wing 24 pivoted in the scale-beam in line with the poise, indicating devices actuated thereby, actuator 29 and pinion 33 for adjusting said actuator, substantially as described.

28. The combination with the scale-beam and its poise, of the wing 24 pivoted in the scale-beam in line with the poise and on one side of its fulcrum, indicating devices on the opposite side of said fulcrum actuated by said wing, actuator 29 carried by the poise and pinion 33 for adjusting said actuator, substantially as described.

29. The combination with the scale-beam and its poise, of the wing 24 pivoted in the scale-beam in line with the poise, indicating devices, worm-gearing connecting said wing and indicating devices, actuator 29 and pinion 33 for adjusting said actuator, substantially as described.

30. The combination with the scale-beam and its poise, of the wing 24 pivoted in the scale-beam in line with the poise and on one side of its fulcrum, indicating devices on the opposite side of said fulcrum actuated by said wing, worm-gearing connecting said wing and indicating devices, actuator 29 carried by the poise and pinion 33 for adjusting said actuator, substantially as described.

In testimony whereof I have hereunto set my hand in the presence of two subscribing witnesses.

FREDERICK L. FULLER.

Witnesses:
T. F. KEHOE,
A. L. KENT.